(12) United States Patent
Desai et al.

(10) Patent No.: US 11,405,427 B2
(45) Date of Patent: Aug. 2, 2022

(54) MULTI-DOMAIN POLICY ORCHESTRATION MODEL

(71) Applicant: Cisco Technology, Inc., San Jose, CA (US)

(72) Inventors: Ronak K. Desai, Fremont, CA (US); Rajagopalan Janakiraman, Cupertino, CA (US); Mohammed Javed Asghar, Dublin, CA (US); Azeem Suleman, San Jose, CA (US); Patel Amitkumar Valjibhai, Fremont, CA (US); Sanjay Kumar Hooda, Pleasanton, CA (US); Victor Manuel Moreno, Carlsbad, CA (US)

(*) Notice: Subject to any disclaimer, the term of this patent is extended or adjusted under 35 U.S.C. 154(b) by 279 days.

(21) Appl. No.: 16/750,841

(22) Filed: Jan. 23, 2020

(65) Prior Publication Data
US 2021/0234898 A1   Jul. 29, 2021

(51) Int. Cl.
  *H04L 9/40*  (2022.01)
  *H04L 47/20*  (2022.01)
  *H04L 61/2557*  (2022.01)
  *H04L 49/25*  (2022.01)
  *H04L 67/10*  (2022.01)

(52) U.S. Cl.
  CPC ........... *H04L 63/20* (2013.01); *H04L 47/20* (2013.01); *H04L 49/25* (2013.01); *H04L 61/2557* (2013.01); *H04L 63/104* (2013.01); *H04L 67/10* (2013.01)

(58) Field of Classification Search
  CPC ....... H04L 63/20; H04L 63/104; H04L 47/20; H04L 49/25; H04L 61/2557; H04L 67/10

USPC .......................................................... 726/1
  See application file for complete search history.

(56) References Cited

U.S. PATENT DOCUMENTS

| 8,204,973 | B2 | 6/2012 | Cuervo et al. |
| 8,422,514 | B1 | 4/2013 | Kothari et al. |
| 9,781,122 | B1 | 10/2017 | Wilson et al. |
| 10,193,708 | B2 | 1/2019 | Koponen et al. |
| 10,659,450 | B2* | 5/2020 | Sridhar ................. H04L 9/3247 |
| 10,904,173 | B2* | 1/2021 | Rangasamy ........ H04L 41/0681 |

(Continued)

OTHER PUBLICATIONS

Chai et al., IEEE Systems Journal, vol. 13, No. 2, Jun. 2019, "A Distributed Interdomain Control System for Information-Centric Content Delivery", pp. 1568-1579 (Year: 2019).*

(Continued)

*Primary Examiner* — Khalil Naghdali
(74) *Attorney, Agent, or Firm* — Polsinelli PC

(57) ABSTRACT

The present technology pertains to a system, method, and non-transitory computer-readable medium for orchestrating policies across multiple networking domains. The technology can receive, at a provider domain from a consumer domain, a data request; receive, at the provider domain from the consumer domain, at least one access policy for the consumer domain; translate, at the provider domain, the at least one access policy for the consumer domain into at least one translated access policy understood by the provider domain; apply, at the provider domain, the at least one translated access policy understood by the provider domain to the data request; and send, at the provider domain to the consumer domain, a response to the data request.

20 Claims, 17 Drawing Sheets

(56) References Cited

U.S. PATENT DOCUMENTS

| | | | |
|---|---|---|---|
| 2013/0227634 A1* | 8/2013 | Pal | G06F 21/552 |
| | | | 726/1 |
| 2017/0264488 A1 | 9/2017 | Ben Ami et al. | |
| 2018/0183794 A1* | 6/2018 | Desai | H04L 67/02 |
| 2019/0297160 A1* | 9/2019 | Harriman | H04L 67/28 |

OTHER PUBLICATIONS

Truong et al., 2019 IEEE International Conference on Blockchain, "Towards Secure and Decentralized Sharing of IoT Data", pp. 176-183 (Year: 2019).*

* cited by examiner

FIG. 3F

MULTI-DOMAIN POLICY ORCHESTRATION MODEL

TECHNICAL FIELD

The present technology pertains to orchestrating networking policies across domains. Specifically, it pertains to translating the policies from a first domain into policies of a second domain, thereby allowing the second domain to appropriately apply first domain policies to ingress and egress traffic for the second domain.

BACKGROUND

A campus network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges a campus network may face include integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT. Current approaches for deploying a network capable of providing these functions often require constant and extensive configuration and administration by highly skilled network engineers operating several different systems (e.g., directory-based identity services; authentication, authorization, and accounting (AAA) services, wireless local area network (WLAN) controllers; command line interfaces for each switch, router, or other network device of the network; etc.) and manually stitching these systems together. This can make network deployment difficult and time-consuming, and impede the ability of many organizations to innovate rapidly and to adopt new technologies, such as video, collaboration, and connected workspaces.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3I illustrate examples of graphical user interfaces for a network management system in accordance with an embodiment;

DESCRIPTION OF EXAMPLE EMBODIMENTS

Figure 1:
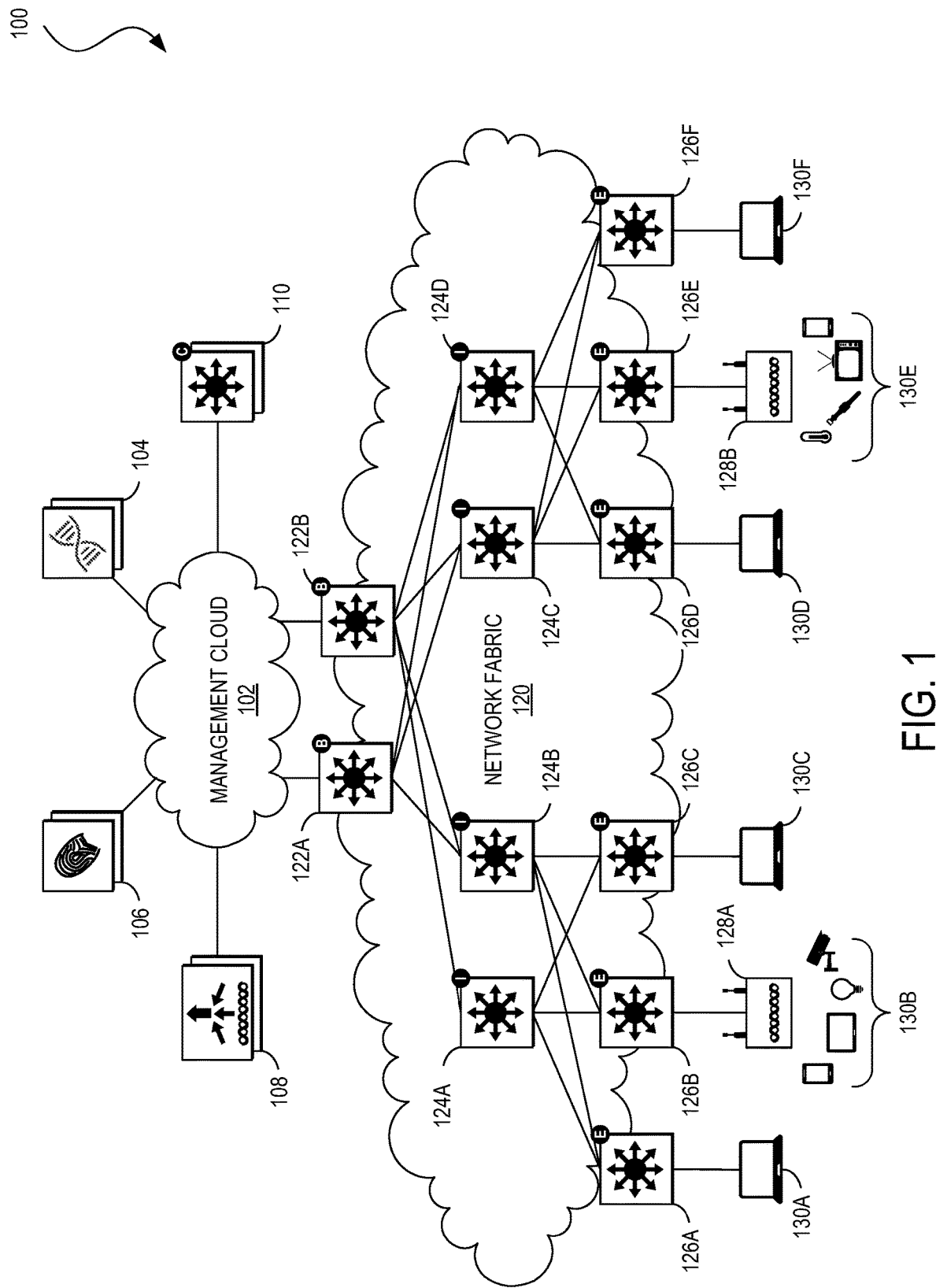
FIG. 1 illustrates an example of a physical topology of an enterprise network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

The present technology pertains to orchestrating policies across multiple networking domains. In particular, an east-west federation model, e.g. server to server model in a datacenter, can be used to deploy cross-domain network policies without requiring a northbound orchestrator. As a result, cross-domain multi-tenancy, end-to-end connectivity based on policy, policy group translations, identity propagation across domains, and/or security contract enforcement between consumer and provider processes across one or more local domains and a remote domain can be provided across one or more managed networks.

The present technology can receive, at a provider domain from a consumer domain, a data request; receive, at the provider domain from the consumer domain, at least one access policy for the consumer domain; translate, at the provider domain, the at least one access policy for the consumer domain into at least one translated access policy understood by the provider domain; apply, at the provider domain, the at least one translated access policy understood by the provider domain to the data request; and send, from the provider domain to the consumer domain, a response to the data request.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Network administrators use policies to regulate traffic across networking domains. However, orchestrating policies across distinct networking domains poses a problem, as networks may have different policy protocols. The systems and methods disclosed herein aim to provide a solution to this need in the art.

With respect to data centers for a software defined access (SDA) campus and an application centric infrastructure (ACI), the SDA campus and the ACI data centers are disjoint policy domains. In other words, each domain has respective policy groups, endpoint identities, and/or contracts, potentially based on a shared or similar underling technology and/or network underlay. Further, additional disjoint domains can be integrated into the SDA campus and ACI data centers such as, for example, a software defined wide area network (SD-WAN), etc., and so on.

At the boundaries of each domain, network administrators typically stitch together connectivity, translation and carriage policy, and identity policy. Contract enforcement points are often chosen naively and, as a result, rules are duplicated and/or errors are introduced to rules or respective enforcement processes.

However, to realize user intent in cross- or multi-domain policies, such as, for example and without imputing limitation, between an SDA campus, an ACI data center, and a SD-WAN, user intents can be expressed as high level inputs and processed by a natural language processing (NLP) engine. The NLP engine may then provide consistent policies across the respective domains, such as, for example and without imputing limitation, multi-tenancy across domains, end-to-end connectivity based on policy, secure policy group translations and identity propagation across domains, and security contracts enforcement across domains between consumer and provider processes in respective domains. For example, the NLP engine may receive a high level input expressing an intent as a user on the SDA campus seeking to consume (e.g., receive outputs from) a customer relationship management (CRM) application in the ACI data center. In another example, a streaming media application hosted in one domain may be providing streaming services to a plurality of users in another domain.

Some aspects of cross- and multi-domain policy that are enabled in this disclosure include, for example and without imputing limitation, multi-tenancy across multi-site ACIs, ACI domain peering with multiple SDA domains, and/or campus endpoint scaling in ACIs, end-to-end policy-based connectivity across an underlay and/or across overlay routing under a control plane, secure translation of policy groups and identity propagation across domains such as stretching (e.g., extending) a SDA campus virtual routing and forwarding (VRF) into an ACI or translating class identifiers to and from virtual network identifiers, and enforcing security contracts across domains between consumers and providers in respective domains such as end point synchronization and policy application services, SDA campus security groups consuming an ACI service, data plane learning, and data plane flows.

In one example, an ACI domain includes one or more ACI sites (e.g., data centers). Each site may be associated with an ACI controller cluster and the entire domain may be associated with a multi-site controller (MSC) cluster for managing cross site configuration. Each externally visible campus tenant (e.g., extranet VRFs) can be hosted as a VRF in a group ACI border leafs determined internally by a respective ACI fabric.

The multi-domain policy solution between the ACI domain and SDA domain (or domains) is based on a federation model rather than a northbound orchestrator or the like. Multi-tenancy is extended across the disjoint domains by representing the consumer process in the service provider domain as a "remote tenant" and also the service provider process in the consumer domain as a "remote tenant".

End-to-end cross-domain connectivity is automated in two ways. Underlay connectivity automation is achieved using anycast addresses (e.g., multiple routing paths are assigned to the respective addresses) and integrated with SD-WAN for application service level agreement (SLA) based traffic path selection. Overlay connectivity automation is achieved by using border gateway protocol over an Ethernet virtual private network (BGP-EVPN) for control plane services and virtualized network infrastructures (e.g., VxLAN, etc.) for data plane services. As a result, a provider service in a first domain can be exposed to many consumers in other domains, and vice versa.

Other benefits include cross-domain policy group and namespace translations (e.g., security group tagging (SGT) to end point group (EPG), etc.) with identity propagation securely across domains, stretching a VRF for a remote tenant into a local tenant domain, such as stretching a SDA VRF into an ACI domain, and vice versa, and end point synchronization via policy group segmentation and policy enforcement and the shared services contract being consumed by the remote tenant VRF as a consumer (e.g., SDA VRF) in ACI and ACI local tenant VRF as provider of a service in ACI and vice versa.

In general, domain characteristics may be reflective of an associated entity. For example, an ACI domain can include a collection of sites under one MSC cluster. Similarly, a collection of SDA sites under one managed network controller can be a domain.

In a cross-domain setting, a single user per domain can do various cross-domain callouts (e.g., application programming interface (API), Kafka provider/consumer calls, etc.) on behalf of a local domain. In some examples, role-based access control (RBAC), within a domain in which the user can update providers and/or consumers, may be handled independently. After all RBAC is enforced internally and accepted, a cross-domain administrator can call remote APIs on the other domains. When the domain administrator invokes APIs on the remote domain, the remote domain may enforce RBAC for the cross-domain administrator to the corresponding local domain objects.

A cross-domain administrator can be created in all the domains using a user and password scheme. A given cross-domain administrator represents one domain. With this, the local domain can initiate a session with any remote domain and issue API callouts on the remote domain on behalf of a local domain.

Administrative scope can be defined and used to enforce contract filters on who can consume or provide across domains. Networking scope can be restricted so that IP addresses of end points cannot be duplicated. As a result, each tenant is a combination of one administrative scope and one networking scope. Each tenant is associated with a set of attributes and/or labels, which can be used for filtering on other domains.

In particular, representation of a domain-tenant combination (e.g., a tuple, etc.) in another domain can extend the represented domain networking (e.g., routing, policy, end points, etc.) into the other domain. For end points in two tenants in two domains to talk to each other, once one of the tenants is extended to the other domain both tenants may intercommunicate between respective domains. As a convention, the consumer tenant may be represented in a respective provider (or service) domain as a remote tenant.

If a tenant is both a consumer and a provider to another domain, then the logic of placing the remote tenant can be decided based on additional logic such as, for example and without imputing limitation, resource constraints and the like. A service, such as that provided by a tenant of a domain for consumption by a tenant of another domain, can be identified by a tuple including a domain identification, a tenant name, and a service name. A consumer may likewise be identified by a tuple including a domain identification, tenant name, and consumer name. The consumer can consume service from any remote domain if allowed by a consumer filter on the respective service.

Consumer filters include authorization rules for consuming a service and can be a combination of a domain, a tenant, and a consumer for a given service. The filter is a combination of allow/deny and can include a conditional instruction sequence. In some examples, a consumer filter can be attached at a tenant, a service, or both.

As used herein this disclosure, "gateway" refers to router(s) connecting a domain with other domains. Gateways are both control plane end point for route exchange and data plane end points for traffic going between consumers and providers/services. Each gateway may be represented by a collection of routers and can cater to a subset of domain and tenant combinations decided internally by a respective local domain.

Endpoints inheriting the same or similar policies can be grouped. Each group may be fully qualified by a combined domain, tenant, and group label. For example, in a SDA, a group can be a SGT, while in an ACI, the same group may be an EPG. In one example, one service can include one or more groups and each of the included groups can come in from one or more tenants. Similarly, a consumer can also include one or more groups which can be defined in one or more tenants.

Each group can be represented by a group identification. The group identification may include a global value within a domain and be carried in packets crossing the domains. In effect, a combination of domain and group identification may form group identifications global across all domains. A remote domain may perform a lookup using the combination of domain and group identification to determine local values for associated with a respective group identification. In effect, group identifications can be independently managed across multiple domains. In some examples, certain group identifications may be used in different domains to mean different groups. Further, group identifications can be embedded in different packet formats such as, for example and without imputing limitation, VxLAN-GPO, i-VxLAN, etc.

End points can include consumers, providers, and/or services and may be discovered and reported in the context of one domain. Each end point can belong to exactly one group and so be classified as belonging to a particular group identification within a respective packet path. Each Group can belong to one or more services, providers, or consumers. For example, if there are two applications running on the same host (e.g., "IP1"), one EPG (e.g., "EPG1") may be generated matching the host. EPG1 is a member of two services (e.g., "S1" and "S2"), each one listening on a different TCP port (e.g., "X" and "Y"). A consumer can consume one of the services. A consumer (e.g., "C1") may consume service S1, a second group (e.g., "EPG2") may be a member of C1, and an endpoint (e.g., "IP2") may be in EPG2. Similarly, another consumer C2 may consume service S2 with a member of a third group (e.g., "EPG3"), and an endpoint (e.g., "IP3") may be in EPG3.

A resultant set of rules may be generated. For example, EPG2 communications with EPG1 on port X may be allowed and EPG3 communications with EPG1 on port Y may also be allowed. IP2 communications on any port with IP1 on port X can be allowed and IP3 communications on any port with IP1 on port Y may be allowed. In summary, one IP belongs to only one group and multiple IPs can be in one group, one group can be associated with multiple services, providers, and/or consumers, and multiple groups can be associated with a single service, provider, or consumer.

Multiple IP addresses can be aggregated to a route and advertised to another domain through, for example, a BGP-EVPN session. Each route may belong to a single tenant (or one VRF as it is pertaining to networking scope) and advertised with a next hop of one of the anycast gateways behind which the route is located. A route may include a subnet and/or be an end point IP address if the subnet is stretched across multiple gateways/sites.

Routes may be learned in context of a tenant in a respective local domain and an equivalent remote tenant on a respective remote domain. A tenant route can be advertised into a remote tenant VRF scope in the remote domain through BGP-EVPN. Routes corresponding to services in the remote domain may be leaked into the remote tenant VRF and advertised into the tenant VRF scope in the local domain through BGP-EVPN session.

As used herein this disclosure, route targets are connectors between tenant VRFs and remote tenant VRFs across domains. When a subnet is stretched across gateways, the respective domain advertises host routes within the subnet so that traffic towards an endpoint reaches the domain on the gateway to which the end point is associated.

Multi-tenancy across all domains is supported. In cases of ACIs across multiple sites, in particular, each MSC cluster is considered as one domain and all the component ACI sites can talk to the end points in peering SDA domain. For the first phase, each ACI site will use two Border Leafs to connect to SDA. Each Site will use one anycast Address as the nexthop for the border leafs on the site.

ACI Subnets on a given site are advertised out with nexthop of the respective site. For subnets that are stretched across sites, host routes will be injected with the respective site's next hop where the server endpoint is located.

Traffic from SDA to ACI will delivered to the anycast address of the site where the ACI endpoint is located.

It is important to keep the bi-directional traffic flow through the same sets of Border Leafs on ACI and SDA side to keep the debugging simple and keep the data plane learning local to leafs within a site, which in turn helps in good convergence and avoids synching of end points across sites.

In one example, an ACI domain peers with multiple SDA domains. The ACI domain maintains separate VRFs for multiple campus VRFs within a given SDA domain or across multiple SDA domains. Further, class identification translation on respective receiver paths may be based on a respective source domain. In effect, the same set of the border leafs can be used to communicate with VRFs in one or more SDA domains.

Underlay networks may be deployed individually at SDA and ACI ends outside of a respective multi-domain orchestration, as the two domains may connect through an unmanaged IP network. The underlay network (e.g., "overlay-1 VRF") can be run open shortest path first (OSPF) and so provide reachability to respective virtual network tunnel end points.

Each ACI site may host two border leafs for the SDA-ACI traffic. The two border leaf switches together form one anycast tunnel end point. For multiple sites, an equal number of anycast addresses may be hosted by border leafs in each site.

The underlay network between the ACL border leaf and campus border leaf can go through an outside network or, in some examples, through an ACI Spine-InterPod/InterSite Network. As a result, as new ACI sites are added, the underlay network used to reach the campus may not need having to change or be updated. On an ACI site addition, the only visible change as seen by the SDA domain is a new anycast address and a new set of routes for the newly added ACI site.

ACI EPG with WAN SLA policy (e.g., differentiated services code point (dscp), loss, jitter, latency, etc.) can be provided by APIC or MSO to vManage for path selection in the SD-WAN to SDA fabric. Likewise, SGT with WAN SLA policy (e.g., dscp, loss, jitter, latency, etc.) may also be provided to vManage for path selection in the SD-WAN to ACI fabrics under MSO.

When determining control plane and overlay routing characteristics, each domain may pick multiple BGP EVPN speakers based on local constraints and communicate the IP address of the BGP speakers to the other domain through cross-domain APIs for setting up the BGP sessions. BGP Sessions are used to advertise the SDA subnets for each remote tenant into the ACI and the ACI service subnets to SDA. The routes can be exchanged with next hops of respective anycast tunnel end points and virtual network identifications of the local domain. Traffic may then use the virtual network identifications of the destination.

Host routes may be injected where a bridge domain subnet spans multiple ACI sites. BGP EVPN sessions may be running on ACI spines and/or leafs depending on internal considerations. Next hop reachability may be provided through the border leafs dedicated for the SDA-ACI traffic.

Policy groups can be translated and identity may be propagated across domains securely. For example, where a SDA Campus VRF extends into an ACI, the SDA domain may initiate a remote tenant setup in the ACI domain. The SDA can provide the route target with which it will export routes for the remote tenant, each remote tenant representing one campus VRF.

For each remote tenant (or campus VRF, etc.), the ACI may provide a remote tenant handle in response, which includes the route target for the routes exported from ACI on the respective VRF. BGP EVPN can be used to exchange the routes.

The ACI may create an L3Out (e.g., an egress port from the ACI domain) for each remote tenant VRF. Each L3Out may be hosted in two border leafs for each site. Campus end points consuming common data center services can be bundled into a single VRF.

In cases of completely isolated services and clients (e.g., internet of things (IOT) services, bridge networks, etc.), multiple campus VRFs may be deployed. The respective SDA may make the determination of remote VRF creation based on internal policy, etc.

Certain packets, such as, for example and without imputing limitation, i-VxLAN packets, crossing domains may carry identification (e.g., a classID, etc.) of a respective source SGT or EPG in the respective source domain and the virtual network identification of the respective destination domain.

The classID is a unique value for the group across all the sites forming the domain. The destination domain receives the traffic in the VRF corresponding to the virtual network identification in the packet and can map the packet source classID into a respective domain local space. The ACI fabric may translate the campus classID (e.g., SGT) in the receiver direction and send the transmit traffic with virtual network identification associated with the respective SDA and classID (e.g., EPG) of the ACI endpoint, which may be same across all ACI sites.

The present technology provides for the enforcement of security contracts across domains, working between consumers and providers in their respective domains.

In cases where a campus security group consumes an ACI service, that service consumption is represented as a "shared service" contract between a Remote Tenant VRF in the ACI and the VRF(s) of one or more Application EPGs representing the ACI service.

As a result of the shared service contract in the ACI, the Subnets representing the ACI service will be leaked into the "Remote Tenant" VRF in the ACI Border and will be advertised into the Campus through BGP-EVPN into the corresponding VRF in the SDA border.

The Subnets representing the service can be the ACI Bridge domain Subnets of the corresponding EPGs (or) they can be the host routes of the end points representing the service, if the bridge domain is stretched across sites. This ensures that traffic destined to a service end point reaches the anycast address of the border leaf (BL) pair of the site where the ACI end point is located.

Similarly, the campus Subnets are advertised from an Extranet VRF in the SDA border into the Remote Tenant VRF in the ACI Border through BGP-EVPN and leaked into one or more application VRFs through shared service contracts inside the ACI fabric.

Some cases involve host routing for stretched border domains (BDs). Since campus end points (EPs) sync within the border leafs on the same site, it's necessary to implement bidirectional flows through the same pair of BLs. If a packet from SDA lands in ACI Site 1 and if the endpoint is in ACI Site 2, it is possible that the reverse flow will exit out of ACI Site 2 itself if the shortest path on Site 2 to campus end point is from Site2's BL. Here, EP sync across two sites for policy on reverse flow is not possible. Hence, we need host border routing (HBR) on ACI BLs.

For end point sync and policy application, when a campus consumer (e.g., one or more SGTs) wants to consume an ACI service (one or more EPGs), the corresponding contract rules are created in the ACI BLs for all the involved EPGs in both the directions. These contract rule actions may be permitted or redirected to, for example, an L4L7 graph inside the ACI fabric.

Each campus SGT is represented as an external EPG in the ACI BL. Data plane learning can be used to add campus end points (e.g., IP addresses) into a respective external EPG. As a result, data plane learning suffices for the traffic originating from a SDA and routing to an ACI.

For scenarios where the ACI fabric is originating traffic towards a SDA, the SDA end point may be pre-programmed or a corresponding identifier can be fetched from the control plane and provided to the external EPG. As a result, respective security policies may be applied to the first packet of the originating traffic. In one example, IP-SGT bindings synchronized from a respective ISE to the ACI are used to address this case. IP-SGT bindings are requested only for those SGTs which require the traffic flow from ACI and, in effect, reduce control plane churn.

An end point learned in one BL is synced to another BL on the same site through, for example, a virtual port channel (VPC) sync mechanism so that the traffic can ingress and/or egress through either BL In cases of database learning, i-VxLAN in a front panel BL interface may be used. In these cases the interface can be an L3 port/switch virtual interface (SVI). Further, the system can map the Campus SG in the receptive (RX) packet into the equivalent classID before doing learning and policy. End point learning can occur in the Data plane, in the BL, or after SG to EPG translation. Learning will not flap, as flows from the campus come from different BLs (within one site) with different source addresses. The system can sync Endpoint learning between BLs for reverse flow to reach either BL. The system, however, refrains from using EPG identification for non-border leafs (NBLs).

Flows from the data campus can be destined to an application end point in the site (or) to another BL destination like a Cloud Endpoint/Golf peer. These flows go through a service graph before heading to the destination, using the general functionality supported for the regular BL case.

Service contracts can be shared between campus VRFs and data center VRFs. In the case of data plane flows, RX flows (e.g., those going from a SDA to an ACI) experience tunnel termination in a campus VRF in a BL based on a VNID in the packet of the flow. In i-VxLAN, the destination is a BL anycast. SG to EPG mapping occurs by learning the end point and providing the learned end point to the EPG while a route lookup occurs through a spine proxy.

The disclosure now turns to various aspects and features of a supporting architecture and system in which the systems and methods discussed above may be deployed. Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g.,/32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
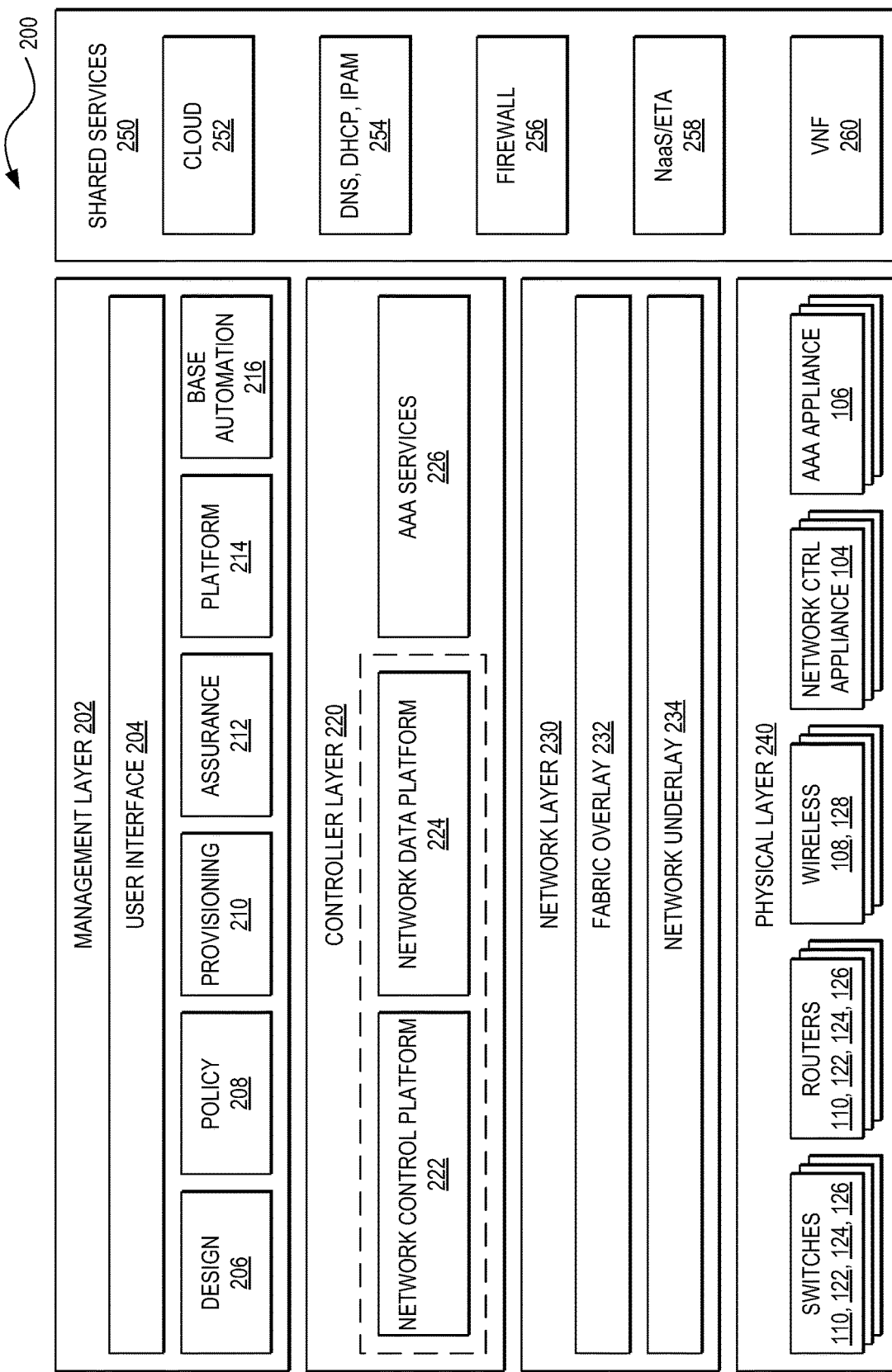
FIG. 2 illustrates an example of a logical architecture for an enterprise network in accordance with an embodiment.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
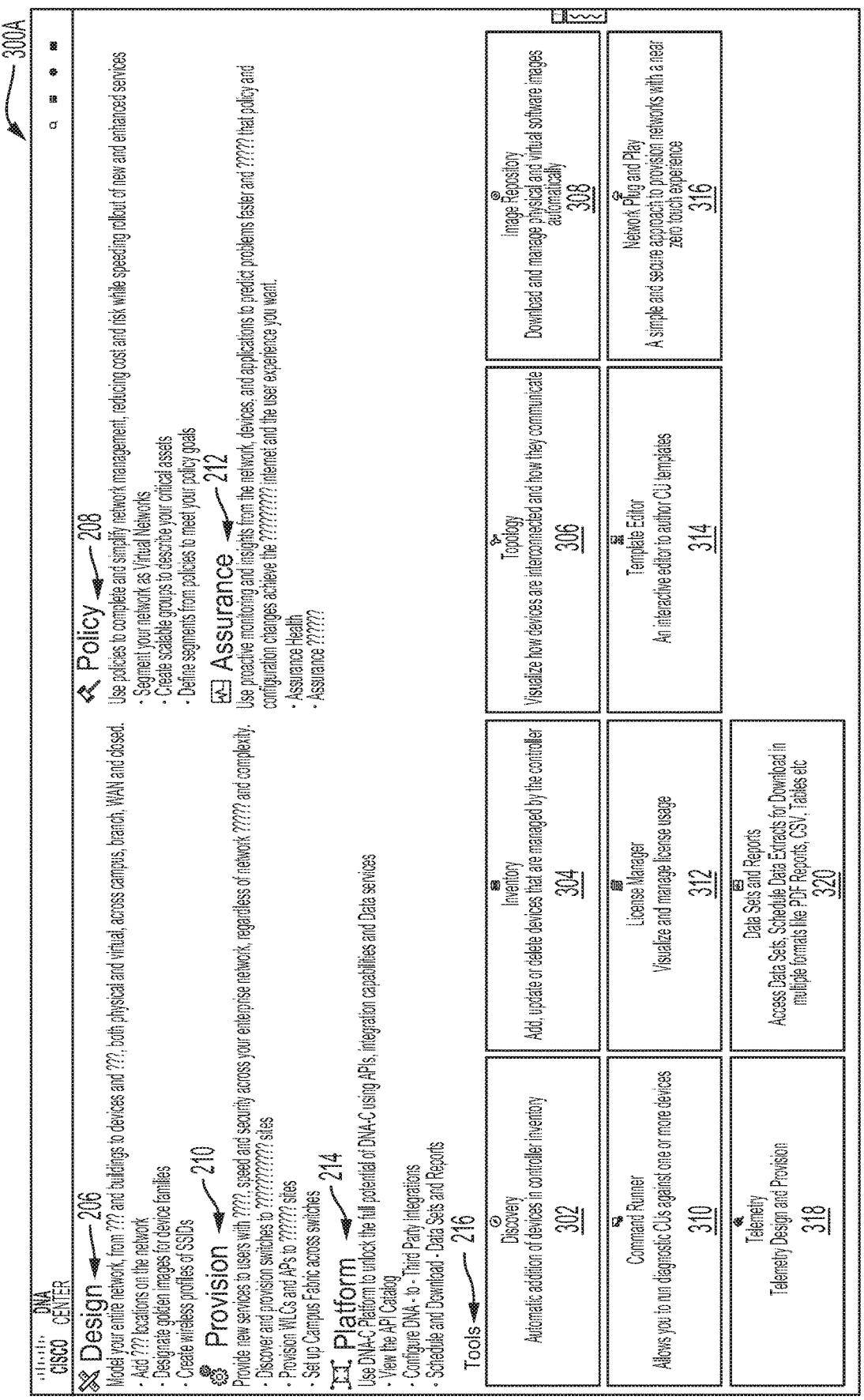

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

- A network discovery tool 302 for automating the discovery of existing network elements to populate into inventory;
- An inventory management tool 304 for managing the set of physical and virtual network elements;
- A topology tool 306 for visualizing the physical topology of network elements;
- An image repository tool 308 for managing software images for network elements;
- A command runner tool 310 for diagnosing one or more network elements based on a CLI;
- A license manager tool 312 for administering visualizing software license usage in the network;
- A template editor tool 314 for creating and authoring CLI templates associated with network elements in a design profile;
- A network PnP tool 316 for supporting the automated configuration of network elements;
- A telemetry tool 318 for designing a telemetry profile and applying the telemetry profile to network elements; and
- A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
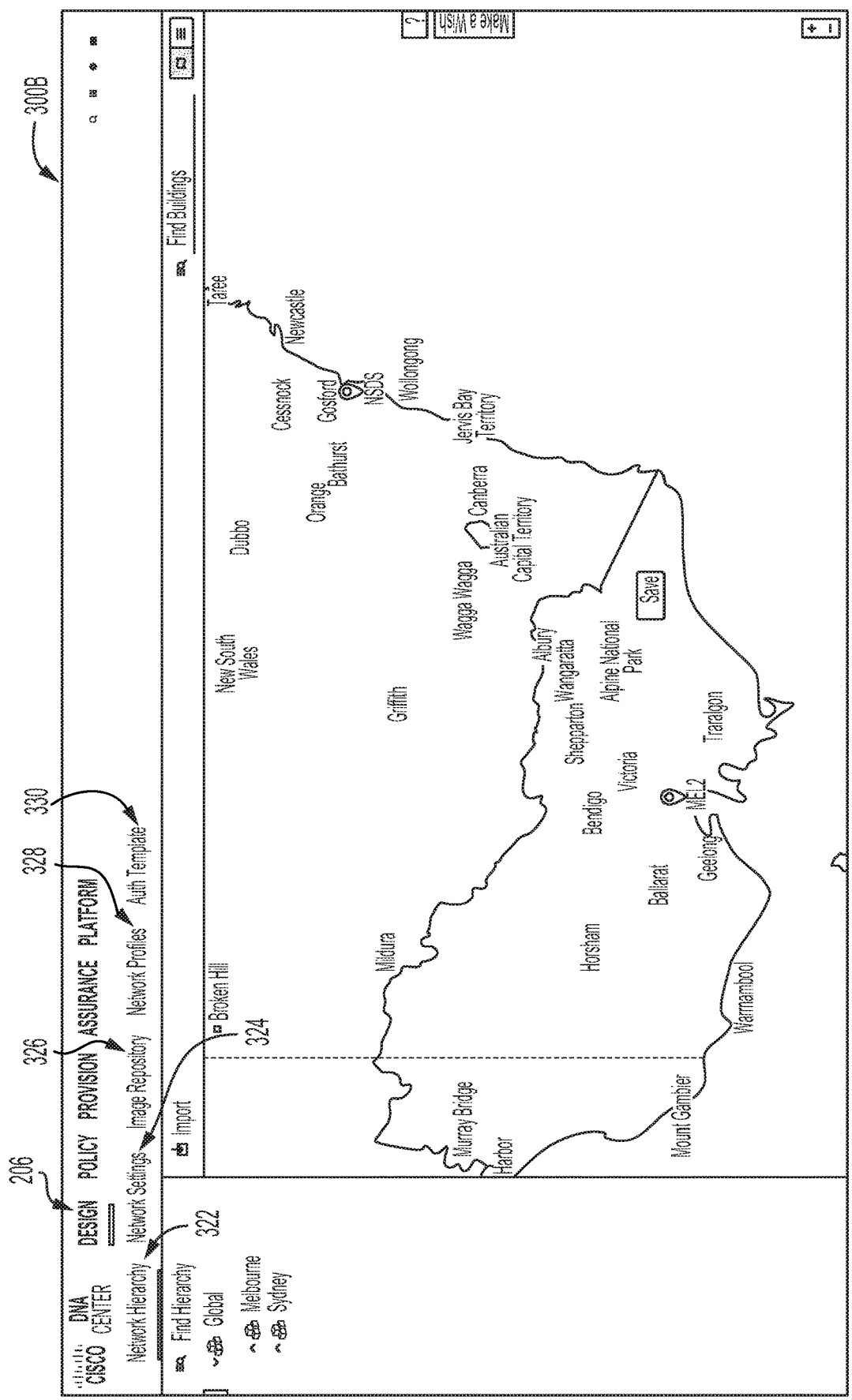

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

- A network hierarchy tool 322 for setting up the geographic location, building, and floor plane details, and associating these with a unique site id;
- A network settings tool 324 for setting up network servers (e.g., Domain Name System (DNS), DHCP, AAA, etc.), device credentials, IP address pools, service provider profiles (e.g., QoS classes for a WAN provider), and wireless settings;
- An image management tool 326 for managing software images and/or maintenance updates, setting version compliance, and downloading and deploying images;
- A network profiles tool 328 for defining LAN, WAN, and WLAN connection profiles (including Service Set Identifiers (SSIDs)); and
- An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
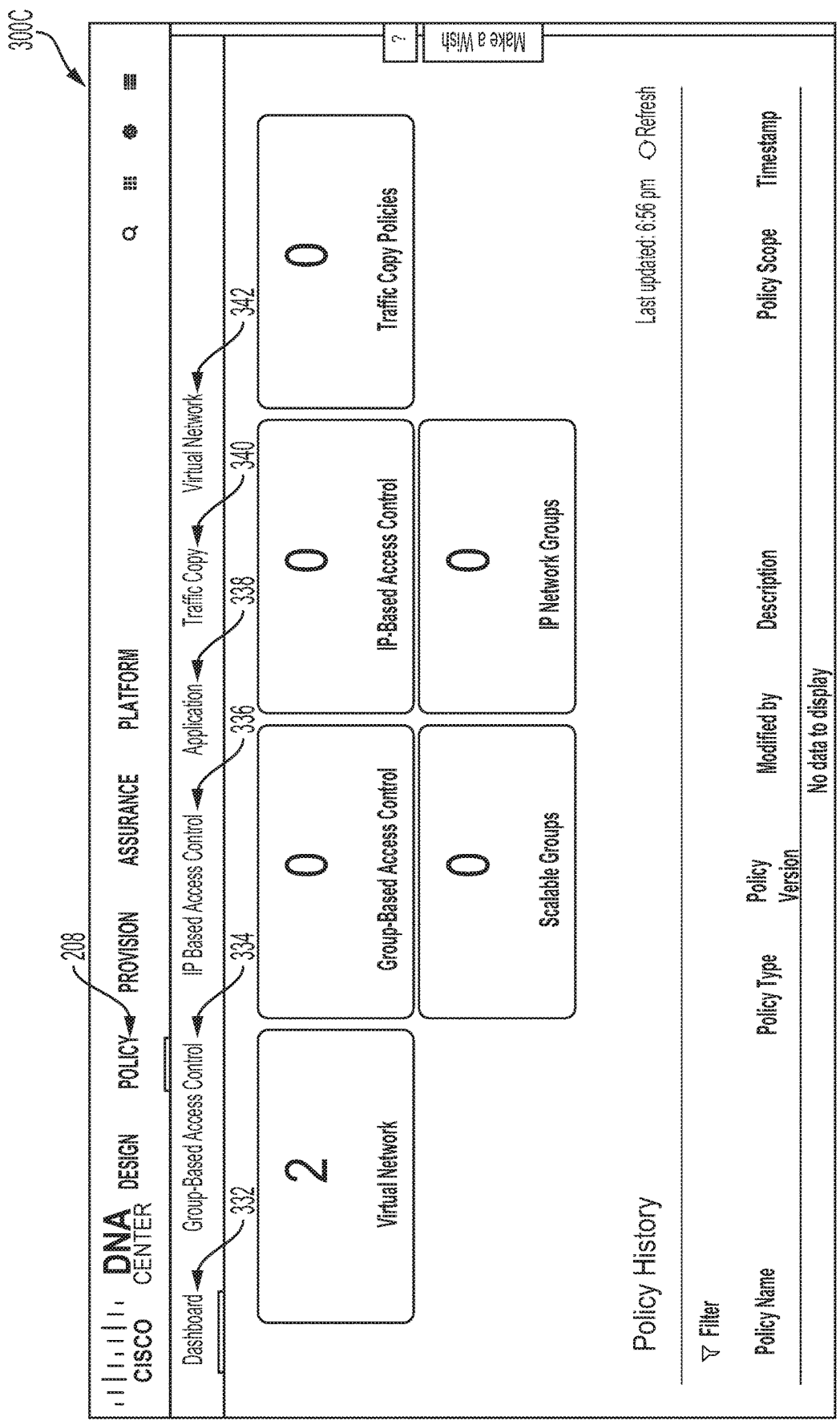

FIG. 3C illustrates a graphical user interface 300C, an example of a landing screen for the policy functions 208. The graphical user interface 300C can include various tools and workflows for defining network policies. In this example, the policy design tools and workflows include:

- A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;
- A group-based access control policies tool 334 for managing group-based access controls or SGACLs. A group-based access control policy can define scalable groups and an access contract (e.g., rules that make up the access control policies, such as permit or deny when traffic matches on the policy);
- An IP-based access control policies tool 336 for managing IP-based access control policies. An IP-based access control can define an IP network group (e.g., IP subnets that share same access control requirements) and an access contract;
- An application policies tool 338 for configuring QoS for application traffic. An application policy can define application sets (e.g., sets of applications that with similar network traffic needs) and a site scope (e.g., the site to which an application policy is defined);
- A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and
- A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
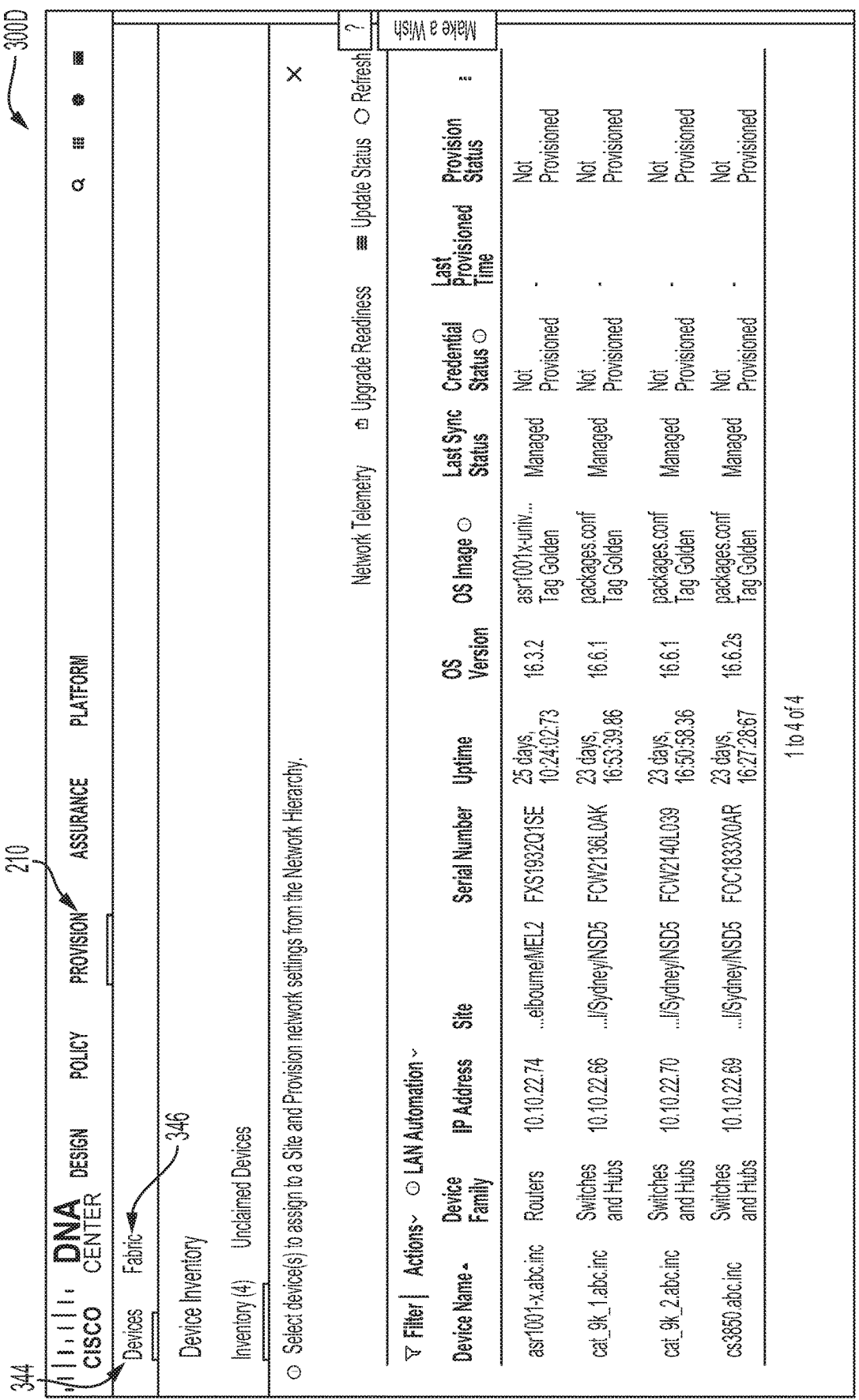

FIG. 3D illustrates a graphical user interface 300D, an example of a landing screen for the provisioning functions 210. The graphical user interface 300D can include various tools and workflows for deploying the network. In this example, the provisioning tools and workflows include:

A device provisioning tool 344 for assigning devices to the inventory and deploying the required settings and policies, and adding devices to sites; and A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
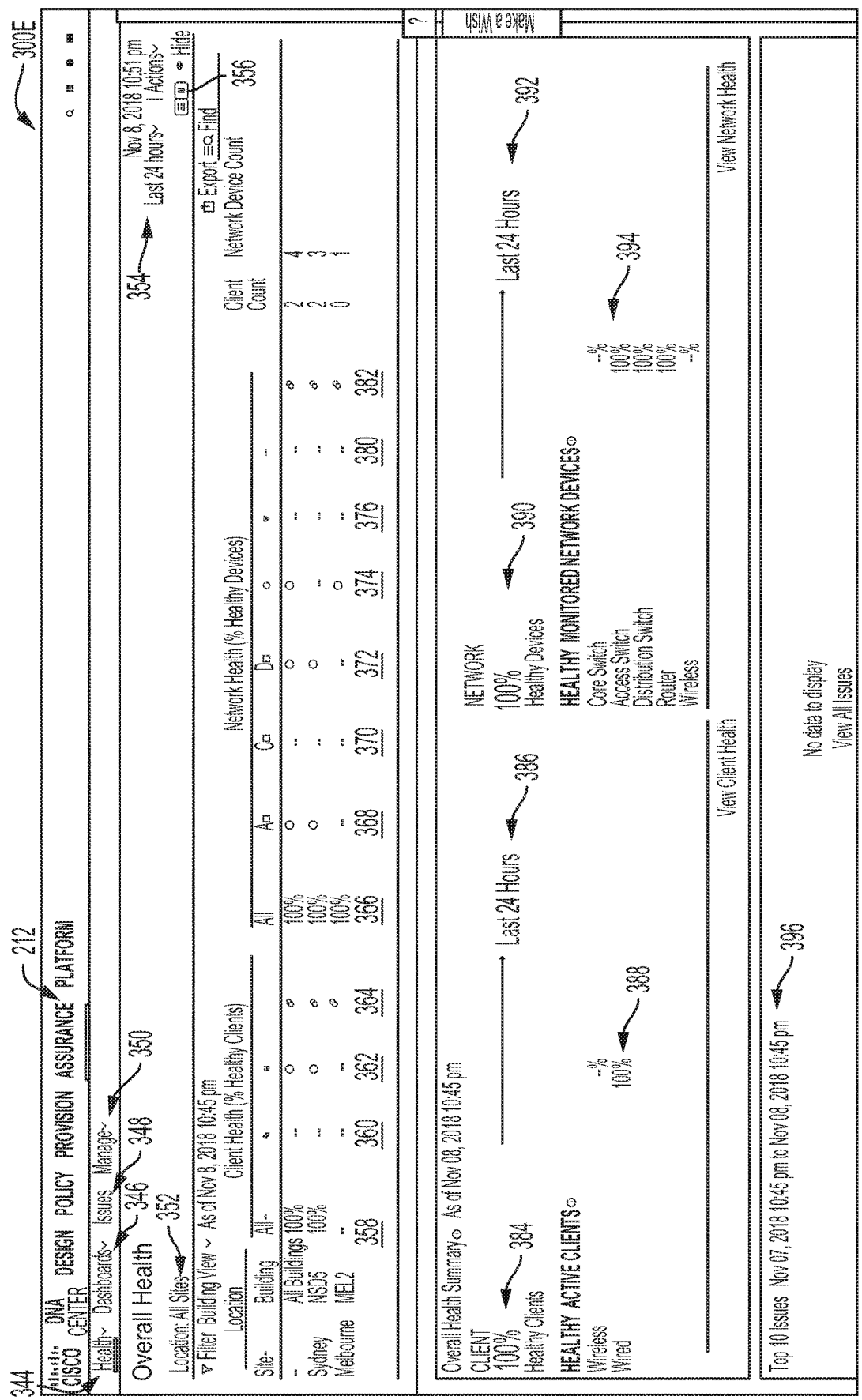

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 352 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
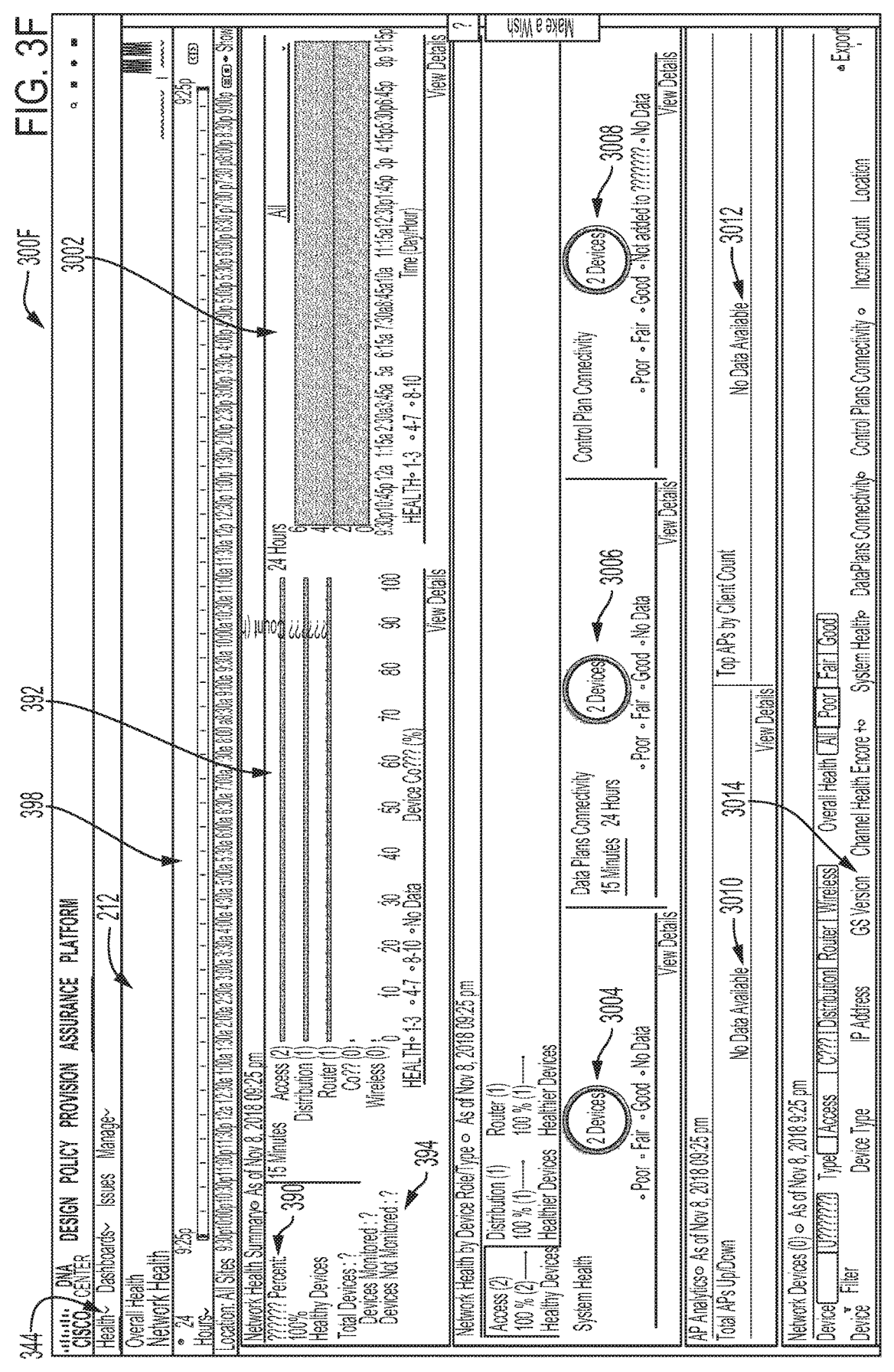

FIG. 3F illustrates a graphical user interface 300F, an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type 394, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
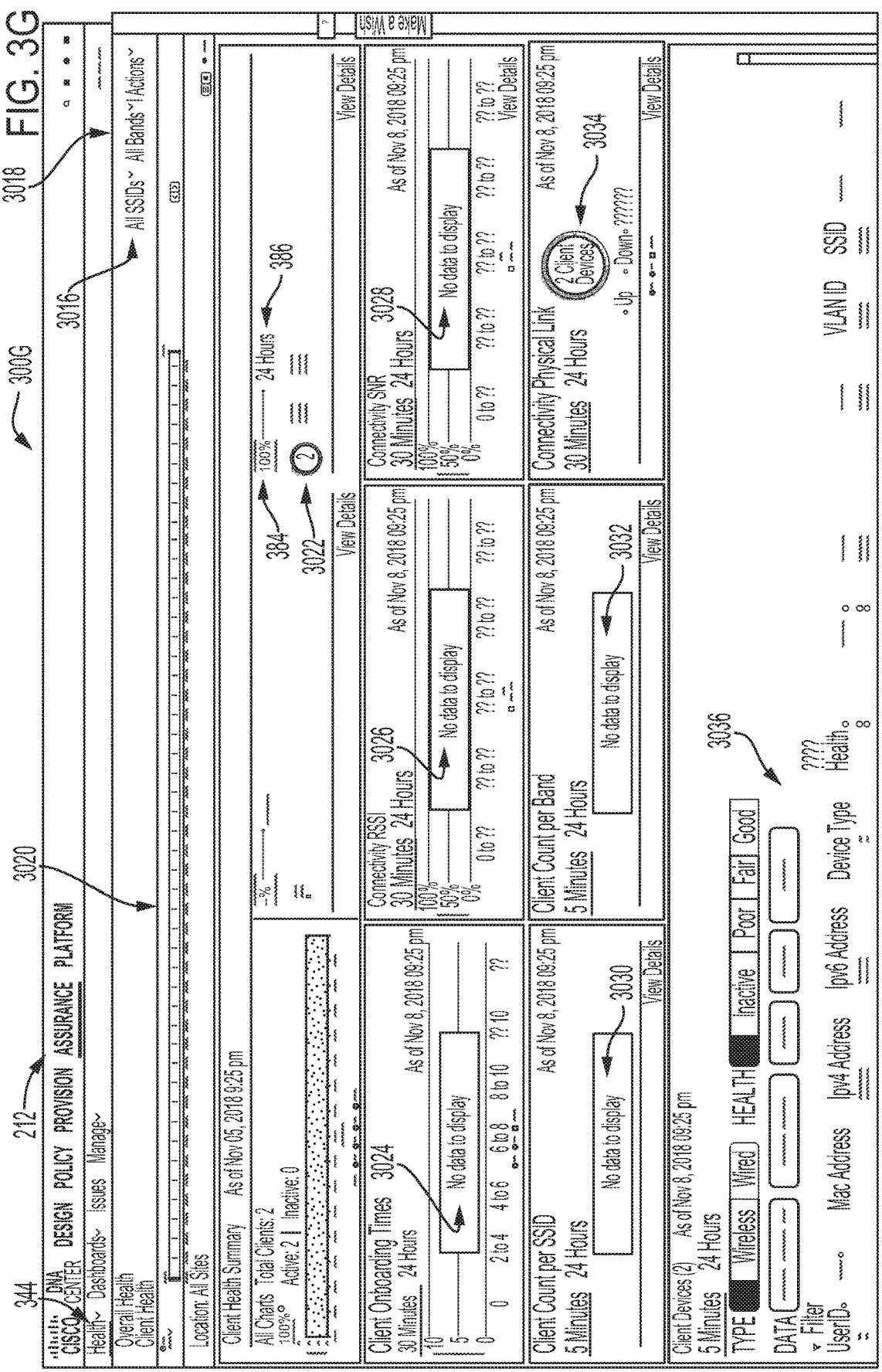

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:
Client onboarding times 3024;
Received Signal Strength Indications (RSSIs) 3026;
Connectivity signal-to-noise ratios (SNRs) 3028;
Client counts per SSID 3030;
Client counts per band frequency 3032;
DNS requests and response counters (not shown); and
Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
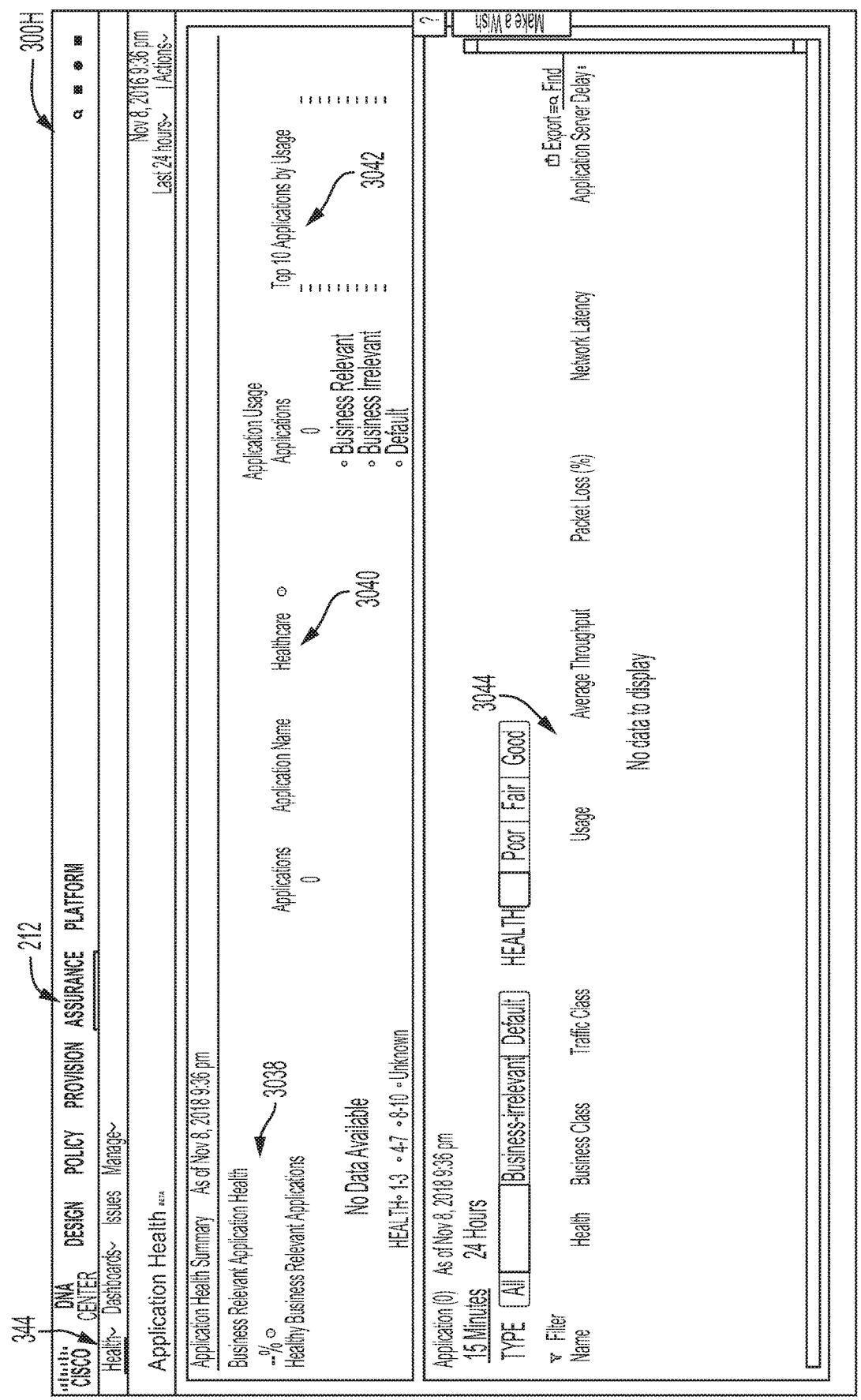
Figure 31:
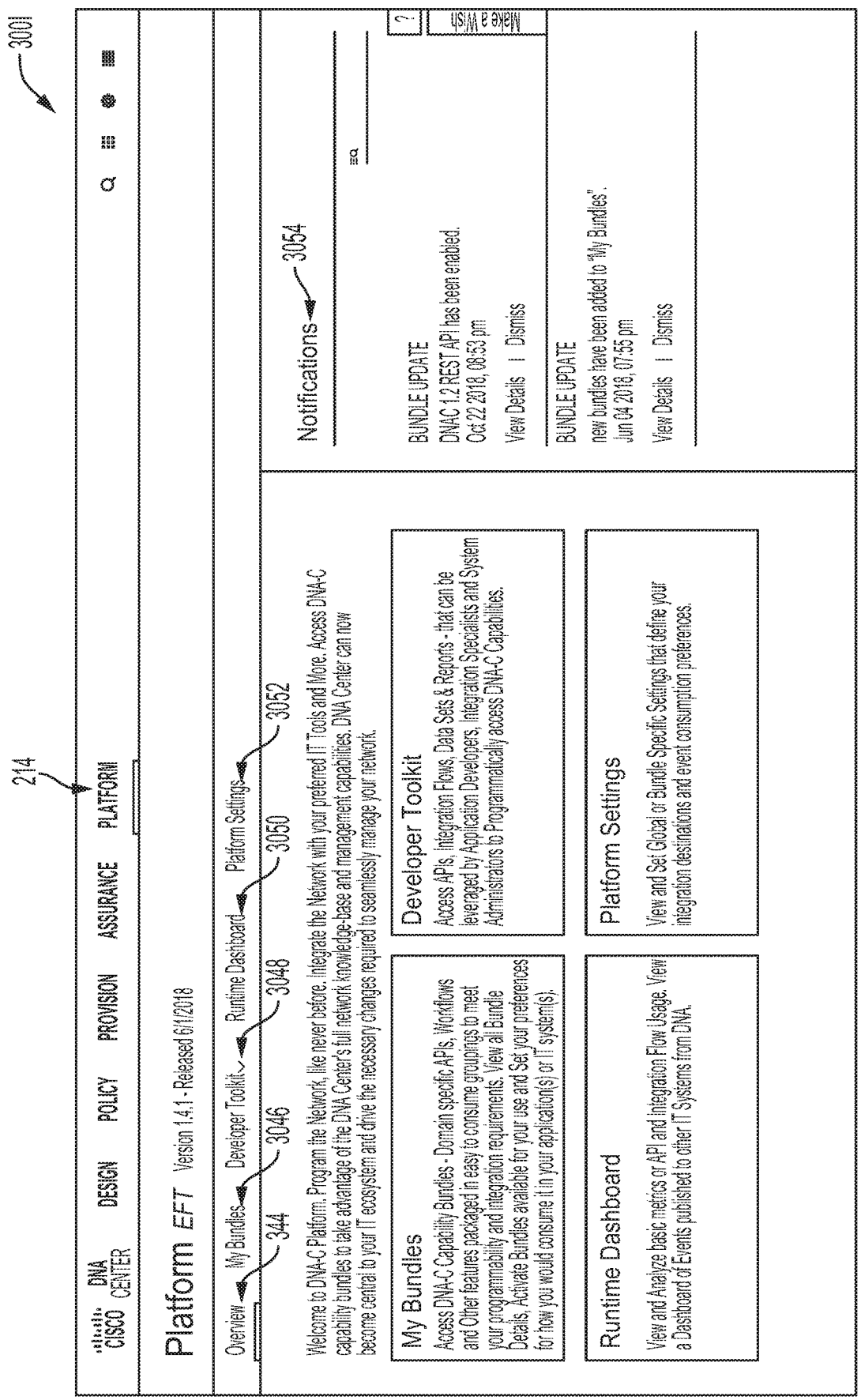

FIG. 3H illustrates a graphical user interface 300H, an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

FIG. 3I illustrates an example of a graphical user interface 300I, an example of a landing screen for the platform functions 210. The graphical user interface 300C can include various tools and workflows for integrating with other technology systems. In this example, the platform integration tools and workflows include:
A bundles tool 3046 for managing packages of domain-specific APIs, workflows, and other features for network programming and platform integration;
A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;
A runtime dashboard 3050 for viewing and analyzing basic metrics or API and integration flow usage;
A platform settings tool 3052 to view and set global or bundle-specific settings that define integration destinations and event consumption preferences; and
A notifications user interface element 3054 for presenting notifications regarding the availability of software updates, security threats, and so forth.
Returning to FIG. 2, the controller layer 220 can comprise subsystems for the management layer 202 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 208 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
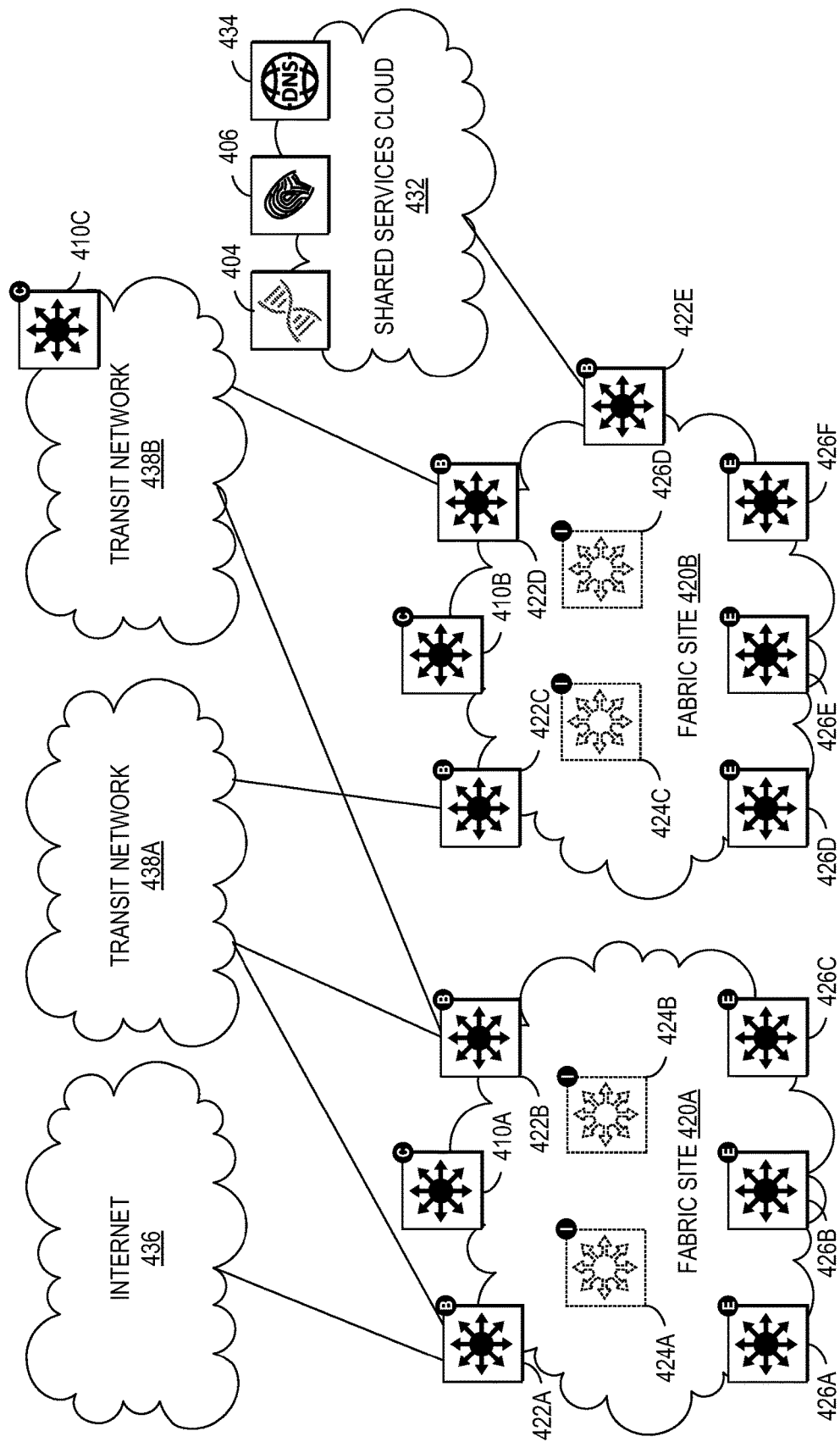
FIG. 4 illustrates an example of a physical topology for a multi-site enterprise network in accordance with an embodiment.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5A:
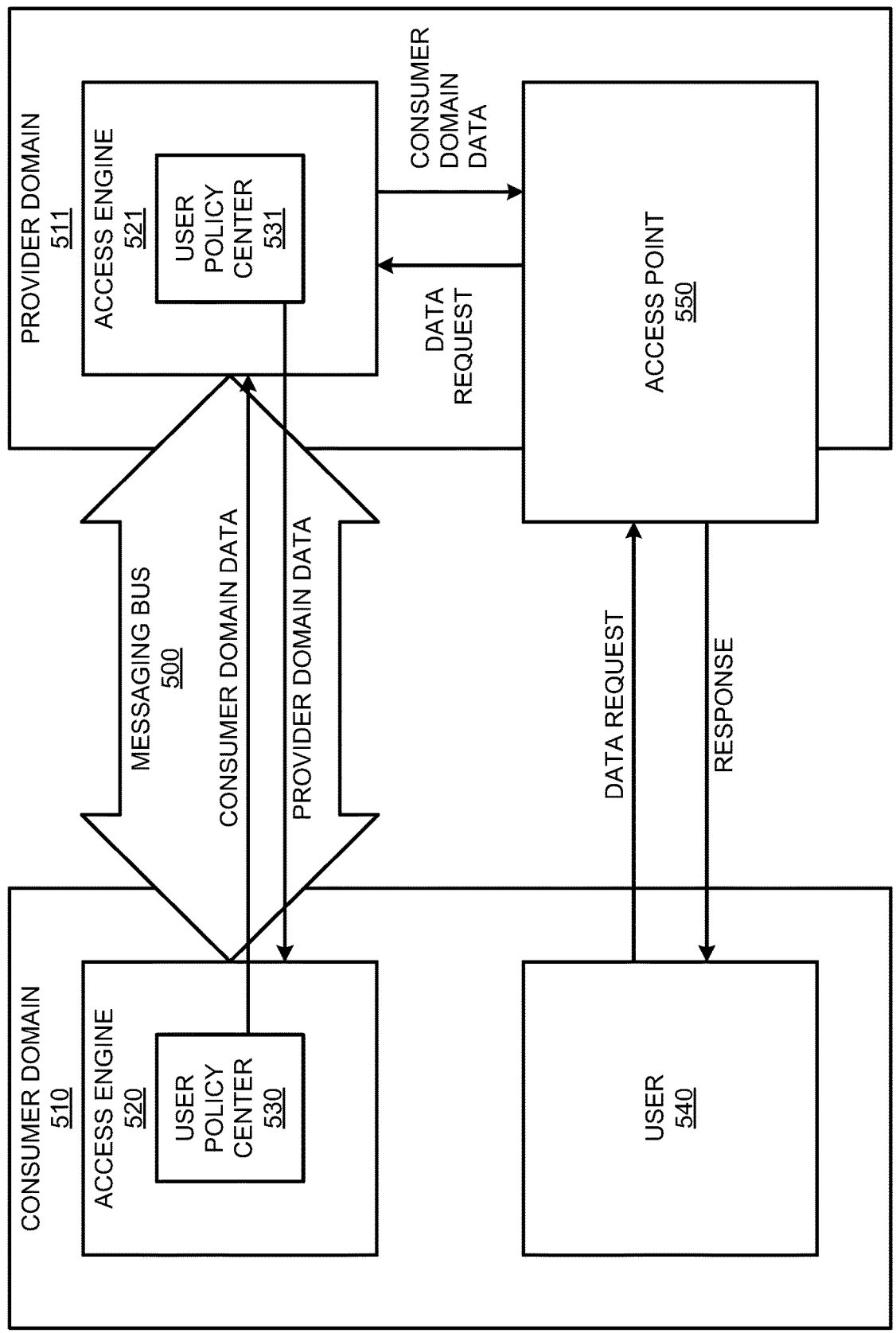
FIG. 5A illustrates an example configuration of devices and a network in accordance with some aspects of the present technology.

FIG. 5A illustrates an exemplary configuration of devices and a network in accordance with some aspects of the present technology. In the example configuration shown in FIG. 5A, a user sends a request from a first domain, Consumer Domain 510 as shown in FIG. 5A, to a second domain, Provider Domain 511 as shown in FIG. 5A. This causes the first domain and second domain to create a messaging bus, which allows the domains to exchange domain policy data. The second domain can then apply the first domain's policy to the user's data request, and responds accordingly to the request.

Consumer Domain 510 is a networking domain containing Access Engine 520 and User 540. Consumer Domain 510 can be an applicable network domain through which a user can access network services. For example, Consumer Domain 510 can be a personal Wi-Fi network, a public wide-area network, or an enterprise intranet. User 540 can be a private individual accessing the Internet at home, a patron at a public library using a public network, or an employee or contractor with a business.

Access Engine 520 can allow users like User 540 to access Consumer Domain 510. It can accept or reject access requests, and determine the access level for users allowed access. Within Access Engine 520, User Policy Center 530 contains access policies for Consumer Domain 510. These policies can be configured by a network administrator or implemented by a learning algorithm on Access Engine 520. Access Engine 520 can be a real or virtual machine.

Provider Domain 511 is a network domain that includes Access Engine 521, and Access Point 550, Provider Domain 511 can be an applicable network domain through which a provider can provision network services to a user, e.g. through a consumer domain. Provider Domain 511, Access Engine 521, and User Policy Center 531 can parallel the functionalities of Consumer Domain 510, Access Engine 520, and User Policy Center 530, respectively. Specifically, Provider Domain 511 can provide the same or different services as Consumer Domain, and can utilize the same or different access policies for users, which can be implemented by the same or different policy protocols.

Access Point 550 can handle requests attempting to access data in Provider Domain 511. By interacting with Access Engine 521, it can store and apply policies housed in User Policy Center 531 to incoming and outing traffic.

Messaging Bus 500 is a secure connection created between Access Engine 520 and Access 521. Messaging Bus 500 can be established and maintained according to an applicable technique for establishing and maintaining a secure connection in a network environment. For example, messaging bus 500 can be formed through a dual-virtual private network (VPN) tunnel. Within Messaging Bus 500, Access Engine 520 and Access Engine 521 publish data from their respective domains. This allows both engines to implement the policies of the other respective domain.

Figure 5B:
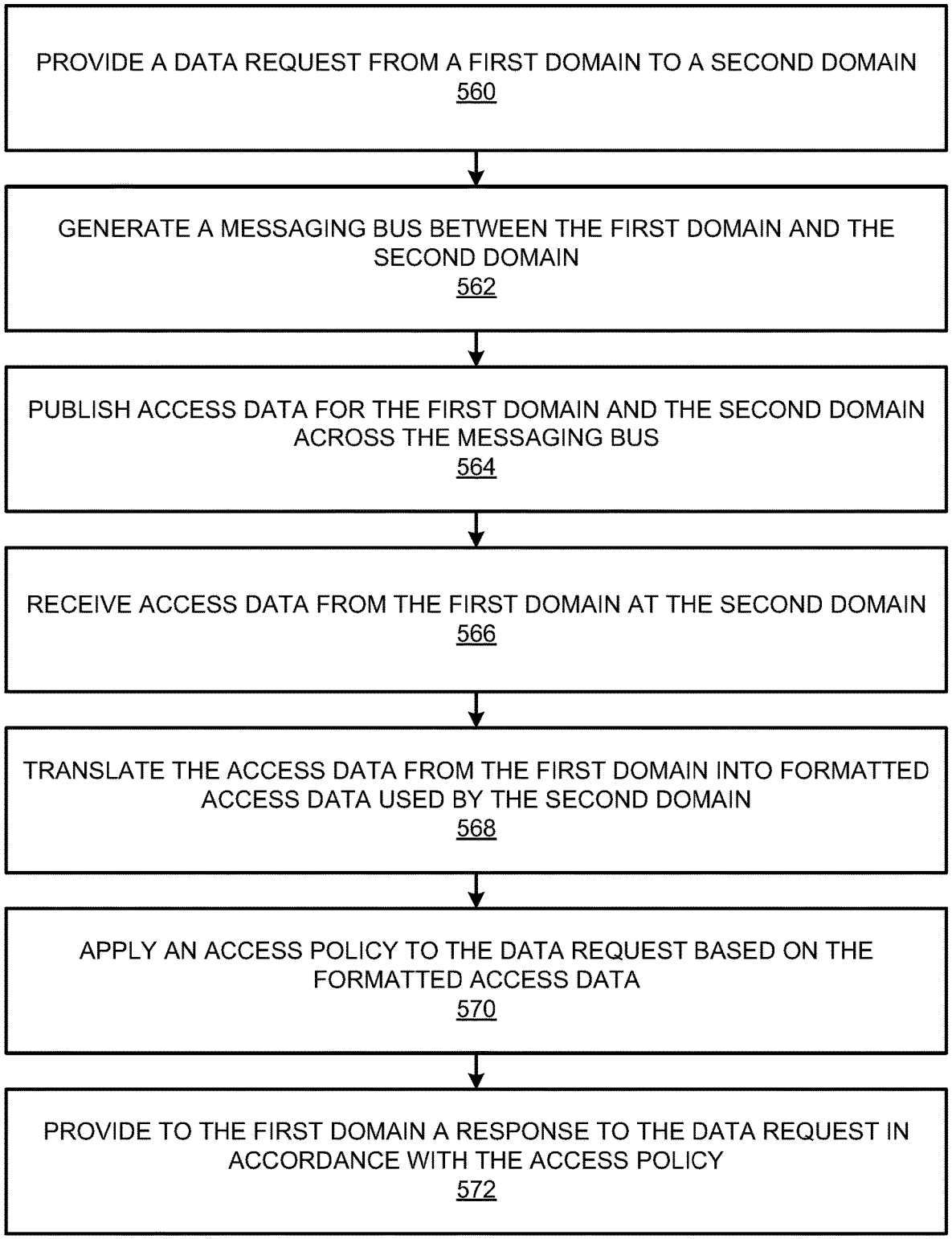
FIG. 5B illustrates an example method embodiment in accordance with some aspects of the present technology.

FIG. 5B illustrates an example method in accordance with some embodiments of the present technology, and can be carried out by the configuration described in FIG. 5A. However, nothing in FIG. 5B should be considered limiting of the configuration illustrated in FIG. 5A, and likewise, the configuration illustrated in FIG. 5A should not be interpreted to limit the method of FIG. 5B.

At step 560, a first domain, such as an SDA, provides a data request to a second domain such as an ACI. In this example, the SDA acts as a consumer domain and the ACI acts as a provider domain.

At step 562, a messaging bus is generated between the first domain and the second domain. Receiving the data request can trigger a standard bussing protocol, such as Windows Azure, to commence and set up the messaging bus between the first domain and the second domain.

At step 564, the first domain and the second domain publish their access data across the messaging bus. Each domain can choose to publish all or a portion of their access data, based on the trust they have in the counterpart domain. The access data can comprise user access policies, device access policies, network access policies, or other data relevant for determining what access an incoming request should receive.

At step 566, the second domain receives the first domain's access data. In some embodiments, reception of the first domain's access data occurs after the second domain subscribes to the data published in the messaging bus.

At step 568, the first domain's access data is translated into a format that can be understood and used by the second domain. This translation can be done by converting security group tags to endpoint groups, among other means. If the first domain and the second domain use the same policy protocol, no translation may be necessary.

At step 570, the second domain applies an access policy to the data request based on the access policy data it received and translated from the first domain. This access policy can deny or restrict the access requested in the data request.

At step 572, the second domain provides the first domain with a response to the data request, in accordance with the access policy.

Figure 5C:
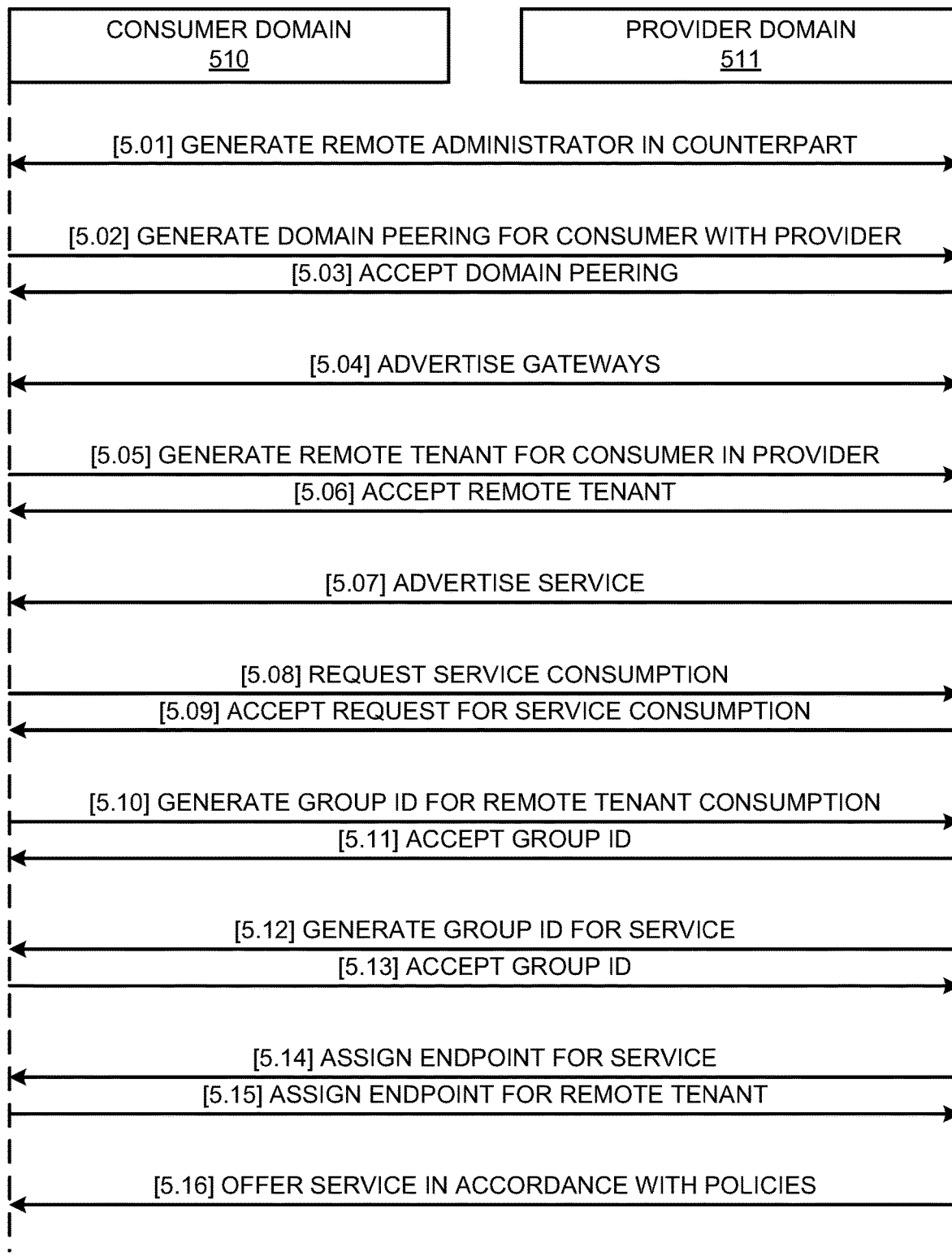
FIG. 5C illustrates an example sequence diagram in accordance with some aspects of the present technology.

FIG. 5C is a general sequence diagram of example processes for orchestrating policies across multiple domains, in accordance with some aspects of the present technology.

With process 5.01, Consumer Domain 510 generates a remote administrator for Consumer Domain 510 within a controller for Provider Domain 511. This generated remote administrator can synchronize out of band with the controller for Consumer Domain 510. Without loss of generality, Provider Domain 511 can do the same with Consumer Domain 510.

With process 5.02, Consumer Domain 510 generates domain peering for itself with Provider Domain 511. This can done using widely available domain peering solutions like Windows Azure, or with a proprietary method. Provider Domain 511 sends a response 5.03 that indicates acceptance of that domain peering. With the domains peered, they can exchange traffic freely. This domain peering is analogous to Messaging Bus 500 created in FIG. 5A.

With process 5.04, both Consumer Domain 510 and Provider Domain 511 advertise the gateways present in the respective domains. This allows the domains to handle traffic passed through the domain peering.

With process 5.05, Consumer Domain 510 generates a remote tenant to begin a tenancy on Provider Domain 511. Provider Domain 511 sends a response 5.06 that indicates acceptance of the tenancy. This remote tenant corresponds to a tenant on Consumer Domain 510, such as User 540.

With process 5.07, both Consumer Domain 510 and Provider Domain 511 advertise the services they provide across the domain peering. They can choose to advertise all or some of these services, depending on the trust level between the two domains.

With process 5.08, Consumer 510 requests the consumption of a service on Provider Domain 511. Per the terms of the domain peering, Provider Domain 511 sends a response 5.09 that indicates acceptance of the service consumption request.

With process 5.10, Consumer Domain 510 generates a group ID for the remote tenant consuming the service. This allows Consumer Domain 510 to apply an appropriate policy to the service consumption. Provider Domain 511 sends a response 5.11 that indicates acceptance of the group ID.

With process 5.12, Provider Domain 511 generates a group ID for the service itself. This allows Provider Domain 511 to apply an appropriate policy to the service consumption. Consumer Domain 510 sends a response 5.13 that indicates acceptance of the group ID.

With process 5.14, Provider Domain 511 assigns an endpoint in Consumer Domain 510 to receive the service. With process 5.15, Consumer Domain 510 assigns an endpoint in Provider Domain 511 for the remote tenant.

With process 5.16, Provider Domain 511 offers the service requested in accordance with the applied policies. Consumer Domain 510 can then consume the requested service in accordance with the appropriate policies.

Figure 5D:
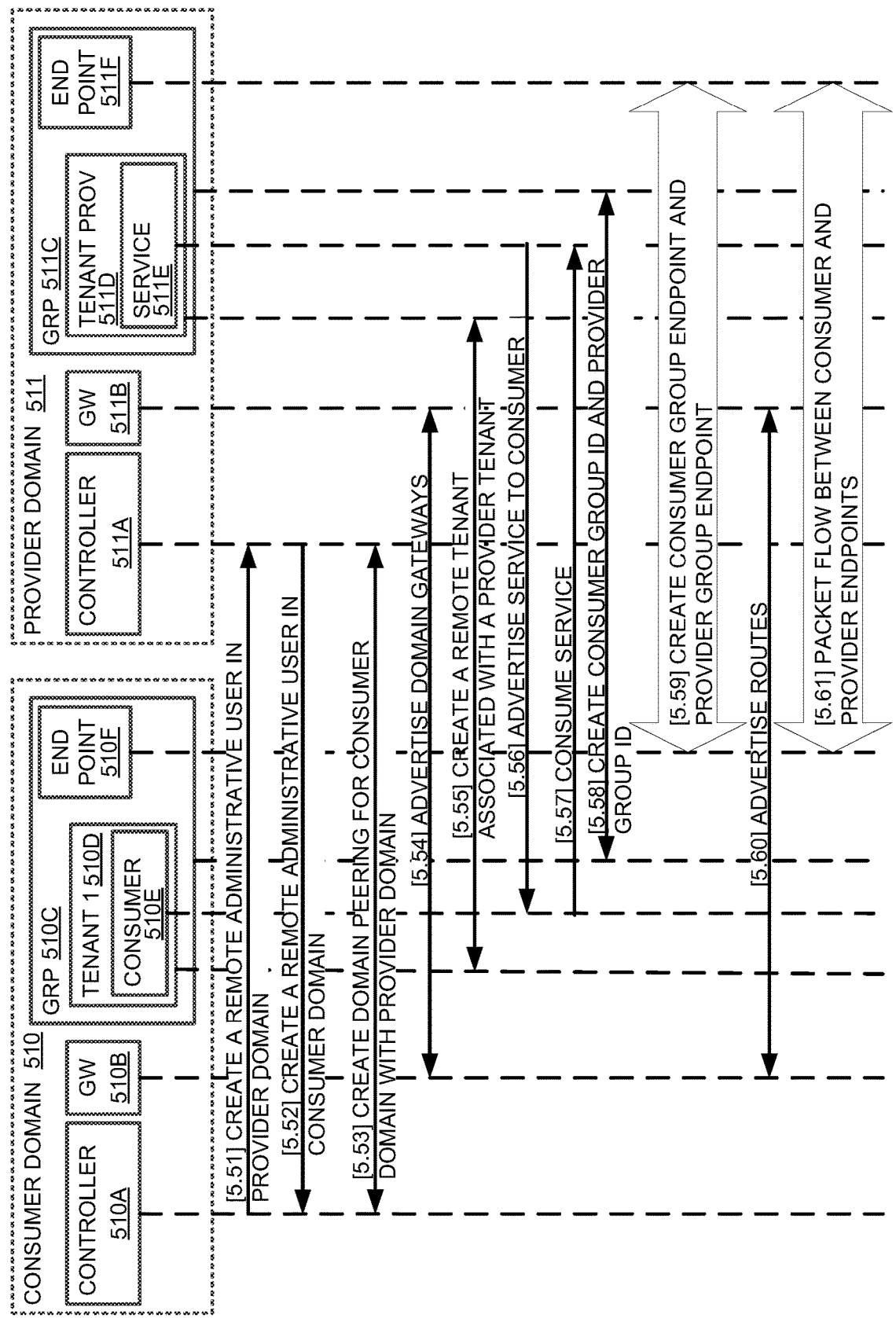
FIG. 5D illustrates an example sequence diagram in accordance with some aspects of the present technology.

FIG. 5D is a sequence diagram illustrating an example of a message passing sequence for orchestrating consumer-provider traffic across two different domains. In some aspects, the sequence diagram of FIG. 5D corresponds to the sequence diagram of FIG. 5C discussed above. Nonetheless, it is understood that various messages in the sequence diagram of FIG. 5D may be modified, added, removed, or otherwise altered without departing from the spirit and scope of this disclosure.

Consumer Domain 510 includes a Controller 510A, a Gateway 510B, and Consumer Group 510C. Consumer Group 510C is made up of Tenant 1 510D, which may be a virtualized process or temporary identification, and Endpoint 510F, which is assigned in order to generate a messaging bus between Consumer Domain 510 and Provider Domain 511, as discussed above. In some aspects, Tenant 1 510D acts as a platform for Consumer 510E through which data from Service 511E may be consumed (e.g., in a producer-consumer, or provider-consumer, model, etc.).

Provider Domain 511 likewise includes a Controller 511A, a Gateway 511B, and Provider Group 511C. Provider Group 511C is made up of Tenant Provider 511D and Endpoint 511F, which serves as a counterpoint to Endpoint 510F. Tenant Provider 511D acts as a platform for Service 511E, which produces data for consumption (e.g., retrieval and processing, etc.) by Consumer 510E.

Controller 510A first sends to controller 511A a message 5.51 to create a remote administrative user in Provider Domain 511. For example, a Consumer Domain 510 remote administrator may be create in Provider Domain 511 and will perform out of band synchronization with Controller 510A. In effect, the created administrative user credentials can be used by Consumer Domain 510 for all APIs invoked on Provider Domain 511.

Controller 511A likewise sends to Controller 510A a message 5.52 to create a remote administrative user in Consumer Domain 510. Similarly to message 5.51 above, message 5.52 may cause the remote administrative user in Consumer Domain 510 to synchronize out of band with Controller 511A.

Messages 5.53 are exchanged between Controller 510A and Controller 511A to create a domain peering for Consumer Domain 510 with Provider Domain 511. For example, an initial message from Controller 510A to Controller 511A may include the following arguments: capabilitySet: control="bgp-evpn" data="i-vxlan", remoteTenantIn="Dom1". A responsive message, from Controller 511A to Controller 510A, accepting the peering, may include the following argument: Resp: Accept control="bgp-evn", data="i-vxlan", remoteTenantIn="Dom1".

Once peering has been established, Gateways 510B and 511B advertise to each other via messages 5.54. Gateways may include, for example, border gateway protocol (BGP) speakers controlling respective domain IPs. Advertising to Gateways 510B and 511B may also be performed over an anycast protocol or the like. Tenant 1 510D, hosting or linked to Consumer 510E, then exchanges messages 5.55 with Tenant Provider 511D to set up a remote tenant link. For example, messages for creating a remote tenant can include the following command parameters: tenant="Dom2, T1" on Dom1, myRouteTarget="RT2", RD format="ASN". Responsive messages may be received, such as: T1 hosted with myRouteTarget=RT1, RD format="ASN:Domain:*".

Once a remote tenant link is generated, Service 511E, hosted on or linked to Tenant Provider 511D, advertises service availability to Consumer 510E via messages 5.56 (e.g., over transmission control protocol (TCP) or the like). In response, Consumer 510E requests data (to consume) via message 5.57 from Service 511E. Service 511E responds with an acceptance based on checking a filter table, such as that in Table 1 below.

TABLE 1

| Dom | Tenant | Action |
|------|--------|--------|
| Dom2 | 1, 2   | Allow  |
| *    | *      | Deny   |

In particular, the filter table of Table 1 indicates that messages from Dom2, or Consumer Domain 510, associated with Tenant 1 510D (e.g., either of tenants "1,2") are allowed access. In comparison, all other domains and tenants are denied access.

In some examples, a consumer group ID and provider group ID is created via messages 5.58 between Group 510C in Consumer Domain 510 and Group 511C in Provider Domain 511.

Having set up respective group IDs, Endpoints 510F and 511F (e.g., IP addresses, etc.), respectively associated with Consumer Domain 510 and Provider Domain 511, are established via process 5.59. Respective Gateways 510B and 511B then advertise routes for Endpoints 510F and 511F to each other. For example, Gateway 510B may advertise a route for Endpoint 510F, or IP1, as: Prefix=Route1, RouteTarget=RT1, NH=ANYCAST-IP1, VNID=vnid-xxx. In particular, the VNID identifies a virtual routing and forwarding (VRF) function, or virtual network, associated with Consumer Domain 510. Likewise, Gateway 511B may advertise a route for Endpoint 511F as: Prefix=Route2, RouteTarget=RT1, NH=ANYCAST-IP2, VNID=vnid-yyy. As a result, traffic such as packet flows between Consumer Domain 510 and Provider Domain 511 may flow between Endpoints 510F and 511F via process 5.61 (e.g., over Messaging Bus 500 discussed above) by including respective endpoint, or IP, destinations.

Figure 6A:
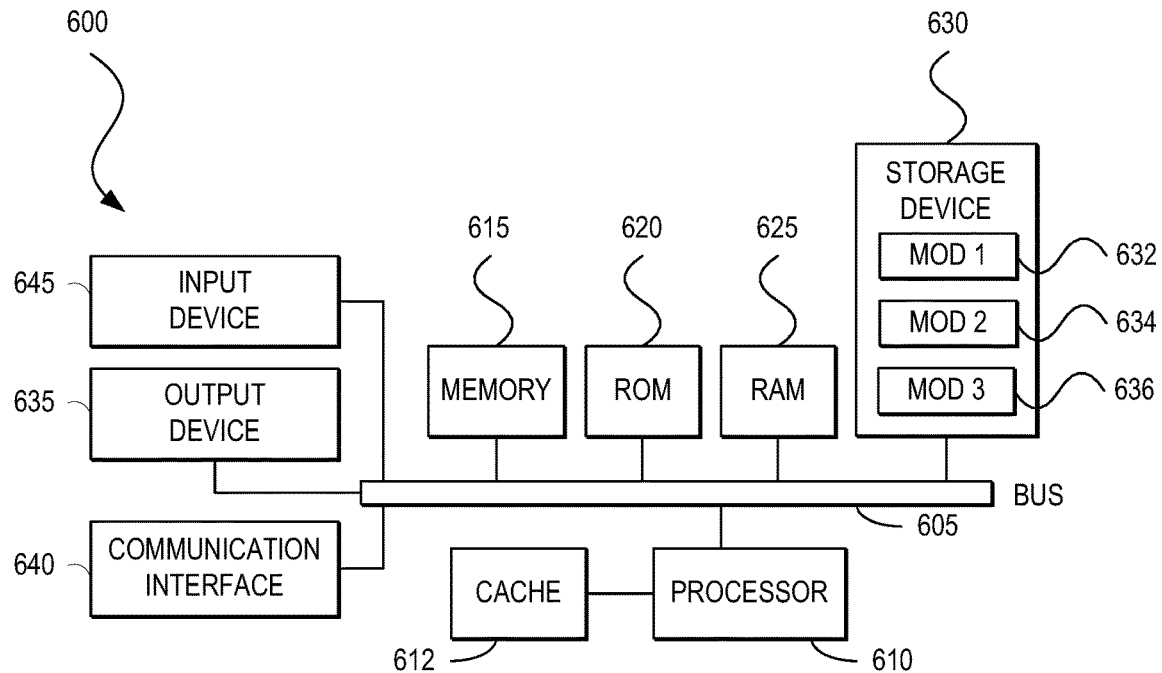
FIGS. 6A and 6B illustrate examples of systems in accordance with some embodiments.
Figure 6B:
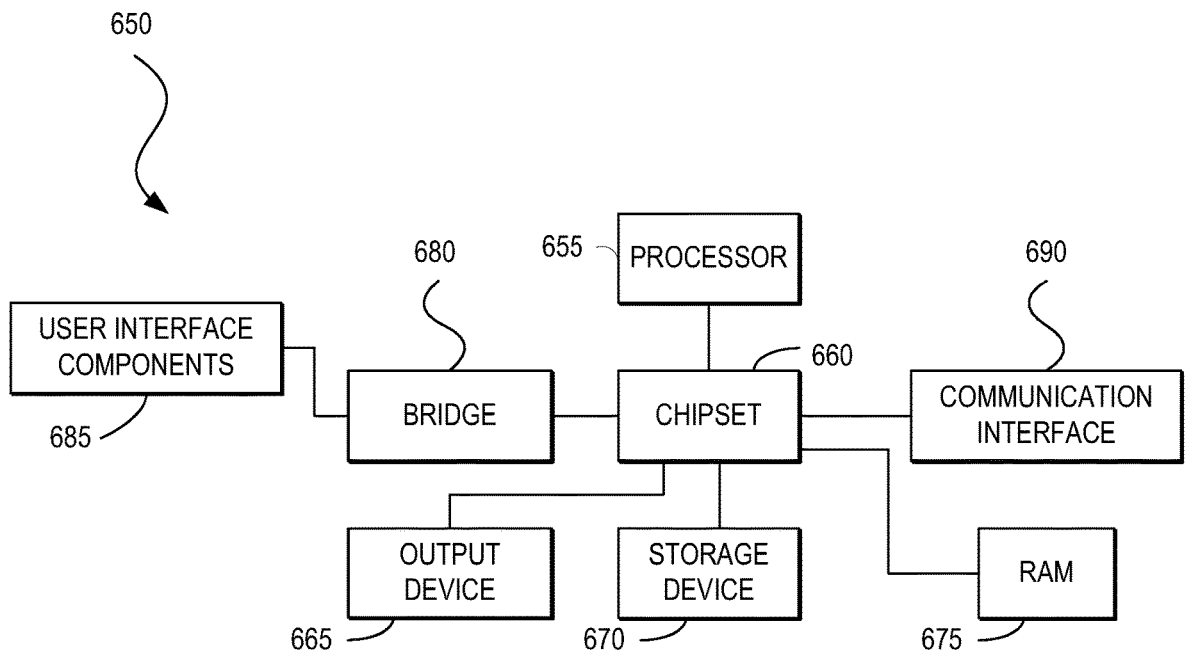

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, at a provider domain from a consumer domain, a data request;
receiving, at the provider domain from the consumer domain, at least one access policy for the consumer domain;
translating, at the provider domain, the at least one access policy for the consumer domain into at least one translated access policy understood by the provider domain based on whether the consumer domain and the provider domain use different policy protocols in enforcing policies in respective domains;
applying, at the provider domain, the at least one translated access policy understood by the provider domain to the data request; and
sending, from the provider domain to the consumer domain, a response to the data request.

2. The method of claim 1, wherein the method described is extensible to any number of domains.

3. The method of claim 1, wherein the at least one access policy for the consumer domain apply to at least one of user identification, user device, time or location of the data request, access point identification, virtual routing or forwarding of the data request, or a security contract.

4. The method of claim 1, the receiving the at least one access policy for the consumer domain further comprising:
generating, between the provider domain and the consumer domain, a messaging bus;
publishing, within the messaging bus, at least one access policy for the provider domain;
publishing, within the messaging bus, the at least one access policy for the consumer domain;
subscribing, by the provider domain, to the at least one access policy for the consumer domain; and
subscribing, by the consumer domain, to the at least one access policy for the provider domain.

5. The method of claim 4, wherein the messaging bus spans at least one other domain.

6. The method of claim 1, wherein the provider domain comprises an access engine.

7. The method of claim 1, wherein the translating the at least one access policy for the consumer domain into the at least one translated access policy understood by the provider domain comprises configuring a security group tag to take effect on an endpoint group.

8. A system comprising:
a provider domain, implemented through one or more hardware processors and a computer-readable medium comprising instructions stored therein that cause the one or more processors to:
receive, from a consumer domain, a data request;
receive, at the provider domain from the consumer domain, at least one access policy for the consumer domain;
translate the at least one access policy into at least one translated access policy understood by the provider domain based on whether the consumer domain and the provider domain use different policy protocols in enforcing policies in respective domains;
apply the at least one translated access policy understood by the provider domain to the data request; and
send a response to the data request.

9. The system of claim 8, wherein the system described is extensible to any number of domains.

10. The system of claim 8, wherein the at least one access policy for the consumer domain apply to at least one of user identification, user device, time or location of the data request, access point identification, virtual routing or forwarding of the data request, or a security contract.

11. The system of claim 8, wherein:
the provider domain and the consumer domain are configured to generate a messaging bus between the provider domain and the consumer domain;
wherein the provider domain is configured to:
publish, within the messaging bus, at least one access policy for the provider domain; and
subscribe to the at least one access policy for the consumer domain; and
wherein the consumer domain is configured to:
publish, within the messaging bus, the at least one access policy for the consumer domain; and
subscribe to the at least one access policy for the provider domain.

12. The system of claim 11, wherein the messaging bus spans at least one other domain.

13. The system of claim 8, wherein the provider domain comprises an access engine.

14. The system of claim 8, wherein the provider domain is configured to translate a security group tag to take effect on an endpoint group.

15. A non-transitory computer readable medium comprising instructions stored thereon, the instructions effective to cause at least one processor to:
receive, at a provider domain from a consumer domain, a data request;
receive, at the provider domain from the consumer domain, at least one access policy;

translate the at least one access policy into at least one translated access policy understood by the provider domain based on whether the consumer domain and the provider domain use different policy protocols in enforcing policies in respective domains;

apply, at the provider domain, the at least one translated access policy understood by the provider domain to the data request; and send, from the provider domain to the consumer domain, a response to the data request.

16. The non-transitory computer readable medium of claim 15, wherein the at least one access policy apply to at least one of user identification, user device, time or location of the data request, access point identification, virtual routing or forwarding of the data request, or a security contract.

17. The non-transitory computer readable medium of claim 15, the instructions to receive the at least one access policy further effective to cause at least one processor to:

generate a messaging bus;

publish, within the messaging bus at least one access policy understood by the non-transitory computer readable medium; and subscribe to the at least one access policy.

18. The non-transitory computer readable medium of claim 17, wherein the messaging bus spans at least one other domain.

19. The non-transitory computer readable medium of claim 15, wherein the instructions to translate the at least one access policy into the at least one translated access policy understood by the non-transitory computer readable medium are further effective to translate a security group tag to take effect on an endpoint group.

20. The non-transitory computer readable medium of claim 15, wherein the data request is received by a provider domain comprising an access engine and the response is sent by the provider domain to a corresponding consumer domain.

* * * * *